(12) United States Patent
Matono et al.

(10) Patent No.: US 10,140,717 B2
(45) Date of Patent: Nov. 27, 2018

(54) IMAGING APPARATUS AND VEHICLE CONTROLLER

(71) Applicant: Hitachi Automotive Systems, Ltd., Hitachinaka-shi, Ibaraki (JP)

(72) Inventors: Haruki Matono, Tokyo (JP); Mirai Higuchi, Hitachinaka (JP); Yuji Otsuka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 511 days.

(21) Appl. No.: 14/770,033

(22) PCT Filed: Feb. 3, 2014

(86) PCT No.: PCT/JP2014/052378
§ 371 (c)(1),
(2) Date: Aug. 24, 2015

(87) PCT Pub. No.: WO2014/132748
PCT Pub. Date: Sep. 4, 2014

(65) Prior Publication Data
US 2016/0005180 A1 Jan. 7, 2016

(30) Foreign Application Priority Data
Feb. 27, 2013 (JP) .................................. 2013-036563

(51) Int. Cl.
*G06T 7/11* (2017.01)
*B60R 1/00* (2006.01)
(Continued)

(52) U.S. Cl.
CPC .................. *G06T 7/11* (2017.01); *B60R 1/00* (2013.01); *G06K 9/00362* (2013.01);
(Continued)

(58) Field of Classification Search
CPC ............. G06T 7/11; G06T 2207/10021; G06T 2207/20021; G06T 2207/20076;
(Continued)

(56) References Cited

U.S. PATENT DOCUMENTS 6,262,409 B1    7/2001 Avaro et al.
7,729,512 B2 *  6/2010 Nishiyama ............... G06K 9/32
                                                    382/100
(Continued)

FOREIGN PATENT DOCUMENTS

JP    2007-316790 A    12/2007
JP     2008-45974 A     2/2008
(Continued)

OTHER PUBLICATIONS

Extended European Search Report issued in counterpart European Application No. 14756720.0 dated Oct. 12, 2016 (12 pages).
(Continued)

*Primary Examiner* — Peter D Nolan
(74) *Attorney, Agent, or Firm* — Crowell & Moring LLP (57) ABSTRACT

In order to provide an imaging apparatus which minimizes erroneous recognition of a moving body and prevent a braking operation from being erroneously performed, even if the moving body is likely to cross a road, the imaging apparatus includes a correlation value calculation unit that calculates a correlation value from two images captured by two imaging units, a three-dimensional object detection unit that detects a three-dimensional object from the two images, a region dividing unit that divides an image region including the three-dimensional object into multiple regions, a relative speed calculation unit that calculates relative speed for every region of the multiple regions, and a reliability calculation unit that calculates reliability of the three-dimensional object, based on the relative speed calculated for every region.

9 Claims, 7 Drawing Sheets

(51) Int. Cl.
  *G06K 9/00* (2006.01)
  *G06T 7/593* (2017.01)
  *G06T 7/223* (2017.01)
  *H04N 13/239* (2018.01)
  *H04N 13/00* (2018.01)

(52) U.S. Cl.
  CPC .......... *G06K 9/00805* (2013.01); *G06T 7/223* (2017.01); *G06T 7/593* (2017.01); *H04N 13/239* (2018.05); *B60R 2300/105* (2013.01); *B60R 2300/8086* (2013.01); *B60R 2300/8093* (2013.01); *B60W 2420/403* (2013.01); *G06T 2207/10021* (2013.01); *G06T 2207/20021* (2013.01); *G06T 2207/20076* (2013.01); *G06T 2207/30196* (2013.01); *G06T 2207/30252* (2013.01); *G06T 2207/30261* (2013.01); *H04N 2013/0081* (2013.01)

(58) Field of Classification Search
  CPC . G06T 2207/30196; G06T 2207/30252; G06T 2207/30261; B60R 1/00; B60R 2300/105; B60R 2300/8093; B60R 2300/8086; H04N 13/239; H04N 2013/0081; G06K 9/00362; G06K 9/00805
  See application file for complete search history.

(56) References Cited

U.S. PATENT DOCUMENTS

| | | | | |
|---|---|---|---|---|
| 8,300,892 | B2* | 10/2012 | Iwasaki | G06T 7/292 348/143 |
| 9,311,534 | B2* | 4/2016 | Liang | G06K 9/00536 |
| 9,524,562 | B2* | 12/2016 | Liang | G06K 9/6212 |
| 2005/0232466 | A1* | 10/2005 | Kampchen | G01S 17/023 382/103 |
| 2006/0215903 | A1* | 9/2006 | Nishiyama | G06K 9/32 382/154 |
| 2007/0274566 | A1* | 11/2007 | Fujimoto | G06K 9/00369 382/103 |
| 2008/0089557 | A1* | 4/2008 | Iwaki | G01C 3/06 382/106 |
| 2008/0199050 | A1* | 8/2008 | Koitabashi | B60R 1/00 382/107 |
| 2009/0153664 | A1* | 6/2009 | Higuchi | G06K 9/00805 348/148 |
| 2011/0091073 | A1* | 4/2011 | Iwasaki | G06T 7/215 382/103 |
| 2011/0228987 | A1* | 9/2011 | Iwasaki | G06T 7/215 382/107 |
| 2013/0194419 | A1* | 8/2013 | Bhowmick | H04N 7/188 348/142 |
| 2013/0335259 | A1 | 12/2013 | Yasugi et al. | |
| 2014/0219505 | A1* | 8/2014 | Kindo | G08G 1/08 382/103 |
| 2015/0055829 | A1* | 2/2015 | Liang | G06K 9/00536 382/103 |
| 2015/0206004 | A1* | 7/2015 | Liang | G06K 9/6212 382/103 |

FOREIGN PATENT DOCUMENTS

| | | |
|---|---|---|
| JP | 2010-66810 A | 3/2010 |
| JP | 2012-43271 A | 3/2012 |
| JP | 2012-123667 A | 6/2012 |
| WO | WO 2012/120856 A1 | 9/2012 |

OTHER PUBLICATIONS

International Search Report (PCT/ISA/210) dated Apr. 15, 2014, with English translation (four (4) pages).

* cited by examiner

IMAGING APPARATUS AND VEHICLE CONTROLLER

TECHNICAL FIELD

The present invention relates to an imaging apparatus including two imaging units, and a vehicle controller.

BACKGROUND ART

The related art in this technical field is disclosed in PTL 1.

PTL 1 discloses a technique relating to pedestrian behavior (travelling road crossing behavior). A knee position movement speed Vkt and a shoulder position movement speed Vst, both of which reflect a pedestrian's intention, are used so as to obtain a conditional expression of pedestrian movement start as a form of knee and shoulder kinetic energy $(Vst/\alpha)2+(Vkt/\alpha)2>1$ (however, Vst>0 and Vkt>0, α: normalization factor). In this manner, based on a square value of speed in the kinetic energy, an improved reflection degree of the knee position movement speed Vkt and the shoulder position movement speed Vst is used in pedestrian behavior prediction so as to improve determination accuracy.

CITATION LIST

Patent Literature

PTL 1: JP-A-2010-66810

SUMMARY OF INVENTION

Technical Problem

When braking is controlled by detecting a moving body in a crossing direction for a vehicle such as an automobile, it is necessary to obtain accurate crossing movement speed in order to determine whether or not the moving body really crosses a road. In contrast, in a case of a pedestrian, a shape thereof greatly varies. Even if a position of the pedestrian is recognized, it is difficult to accurately obtain information on how far the pedestrian is moved. If the speed of the pedestrian is erroneously calculated, it is determined as if the pedestrian has collided with a host vehicle. Consequently, there is a problem in that the host vehicle may be erroneously and suddenly braked.

That is, an object of the present invention is to provide an imaging apparatus which decreases a possibility of erroneously recognizing a moving body and prevents erroneous braking control, even when the moving body is likely to cross a road.

Solution to Problem

To solve the above-described problem, according to the present invention, there is provided an imaging apparatus that is configured to include: a correlation value calculation unit that calculates a correlation value from two images captured by two imaging units; a three-dimensional object detection unit that detects a three-dimensional object from the two images; a region dividing unit that divides an image region including the three-dimensional object into multiple regions; a relative speed calculation unit that calculates relative speed for every region of the multiple regions; and a reliability calculation unit that calculates reliability of the three-dimensional object, based on the relative speed calculated for every region.

Further, according to the present invention, there is provided a vehicle controller that is configured to include: an imaging apparatus having a correlation value calculation unit that calculates a correlation value from two images captured by two imaging units, a three-dimensional object detection unit that detects a three-dimensional object from the two images, a region dividing unit that divides an image region including the three-dimensional object into multiple regions, a relative speed calculation unit that calculates relative speed for every region of the multiple regions, and a reliability calculation unit that calculates reliability of the three-dimensional object, based on the relative speed calculated, for every region; and a control unit that controls deceleration and acceleration, based on the reliability calculated by the imaging apparatus.

Advantageous Effects of Invention

According to the present invention, it is possible to provide an imaging apparatus which can decrease a possibility of erroneously recognizing a moving body and can prevent erroneous braking control, even when the moving body is likely to cross a road.

DESCRIPTION OF EMBODIMENTS

Hereinafter, each embodiment will be described with reference to the drawings.

Embodiment 1

In the present embodiment, an example of an imaging apparatus will be described which outputs reliability by detecting a three-dimensional object and calculating relative speed. Herein, a case will be described in which the three-dimensional object is a moving body such as a pedestrian.

In recent years, a moving body detection apparatus has been practically used which detects a moving body such as a pedestrian or a vehicle by using multiple imaging units (cameras) such as stereo cameras. The stereo camera is a device which calculates deviation (parallax) of the same object (three-dimensional object) on multiple images captured by using template matching at the same time, and which calculates a position of the object (three-dimensional object) in an actual space by using a known conversion system, based on the calculated a parallax.

The stereo camera recognizes the object by using a pair of images captured by two imaging units and by calculating a distance from the object such as the pedestrian, and can be applied to a monitoring system for detecting a suspicious person's intrusion or abnormal state, or an in-vehicle system for supporting safe driving of vehicles.

The stereo camera used in the above-described monitoring system or in-vehicle system obtains a distance by applying a triangulation technique to a pair of images captured at position intervals, and generally includes at least two imaging units and a large scale integration (LSI) unit for stereo image processing which is an image processing unit for performing a triangulation process on the two images captured by the imaging units. The large scale integration (LSI) unit for stereo image processing which functions as an image processing unit is adapted to perform processing for obtaining a deviation amount (parallax) of a matching position between two images by superimposing pixel information included in the pair of images. In this manner, the triangulation process is realized. Therefore, since it is ideal that deviation except for the parallax is absent between the pair of images, it is necessary to adjust each imaging unit so as not to have deviation of optical characteristics or signal characteristics, or to determine a positional relationship between the cameras.

Figure 1:
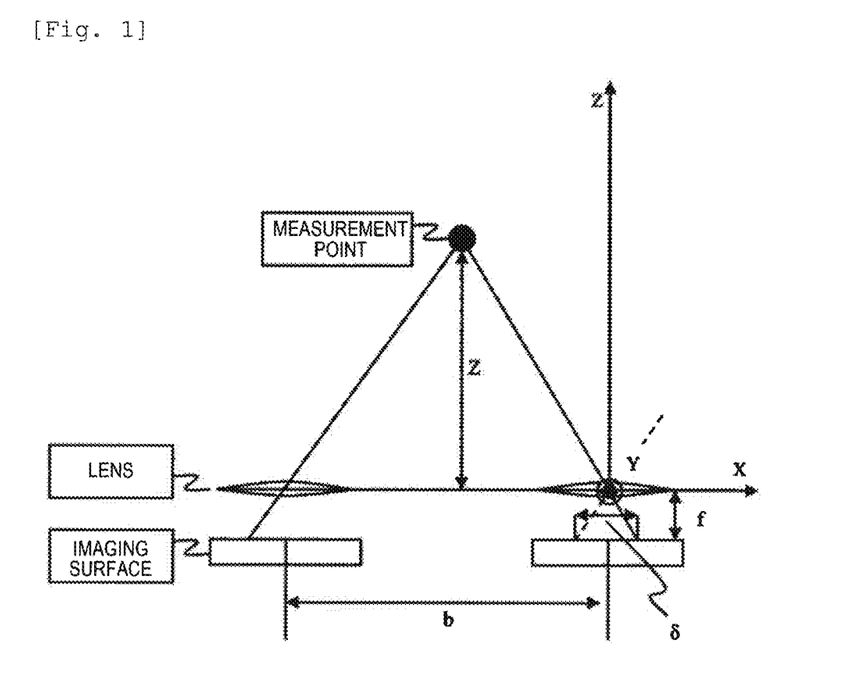
FIG. 1 is a view for describing a principle of a stereo camera.

FIG. 1 is a view illustrating a general principle of the stereo camera. In FIG. 1, δ represents parallax, Z represents a measurement distance (distance from a lens to a measurement point), f represents a focal length (distance from an imaging surface to a lens), and b represents a base length (length between two imaging elements), respectively. A relationship expressed by Equation 1 below is established among them.

(Equation 1)

$$Z = bf/\delta \quad (1)$$

Figure 2:
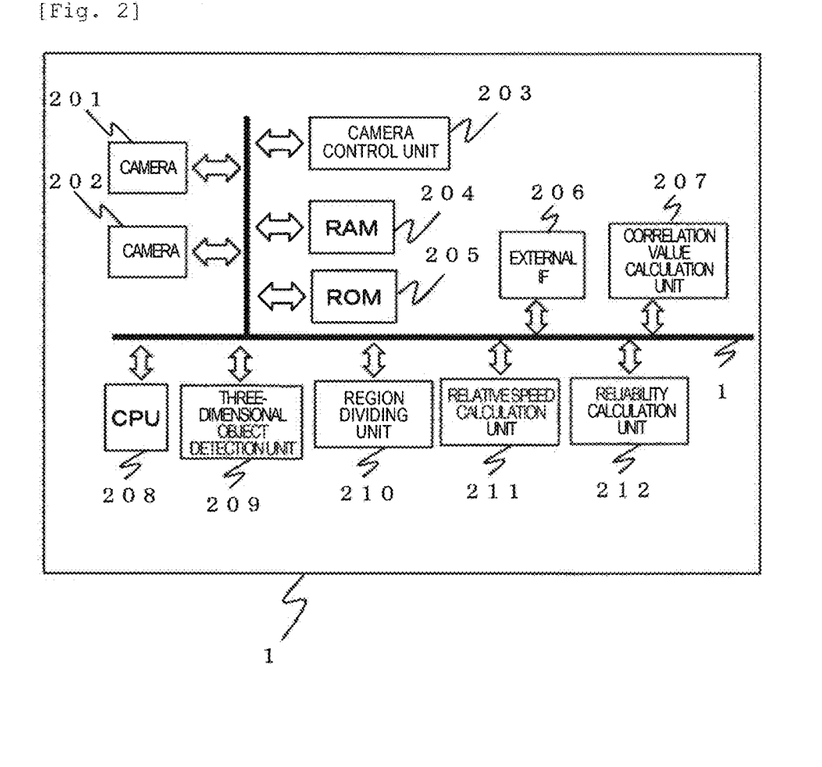
FIG. 2 is a view illustrating an example of a configuration of an imaging apparatus according to the present invention.

FIG. 2 illustrates an overall system configuration of a distance measurement method in the imaging apparatus which functions as the stereo camera according to the first embodiment of the present invention.

The imaging apparatus includes a camera 201 which functions as a first imaging unit and a camera 202 which functions as a second imaging unit, and is configured to be capable of measuring the distance in a stereoscopic manner. The imaging apparatus is configured to include a camera control unit 203 which controls the camera 201 and the camera 202, a RAM 204 which is a temporary storage area, a ROM 205 which stores programs or various initial values, an external IF 206 which functions as communication means for notifying a control system for brakes or a user of a state recognized by the camera, a correlation value calculation unit 207, a CPU 208 which controls an overall system, a three-dimensional object detection unit 209 which detects a three-dimensional object by using the output result from the correlation value calculation unit 207, a region dividing unit 210 which optionally divides a region within the result from the three-dimensional object detection result 209, a relative speed calculation unit 211 which calculates relative speed for each divided region, and a reliability calculation unit 212 which calculates reliability from the relative speed result. All of these can mutually exchange data via a bus 1 which functions as a communication line.

The camera 201 and the camera 202 are imaging elements such as charge coupled device (CCD) image sensors or complementary metal oxide semiconductor (CMOS) sensors.

The camera control unit 203 is a block for controlling the camera 201 and the camera 202, and has a function for controlling two cameras so as to be operated at the same imaging timing and a function for controlling two cameras so as to have equal light exposure. The function is provided in order to obtain the same luminance value when a distance is measured by using the camera 201 and the camera 202 so as to search for a corresponding point between both of these cameras.

The correlation value calculation unit 207 will be described in detail with reference to FIG. 5.

Correlation value calculation is a calculation method of searching for the most correlative position in the horizontal direction from the image obtained by the camera 201 and the camera 202 and specifying the position thereof. A difference between a searching start position of the camera 201 of the stereo camera and the most correlative position in the camera 202 represent parallax δ. The great parallax δ indicates that a distance from an object is close, and the small parallax δ indicates that the distance is far. The calculation method of a correlation value according to the present embodiment employs a sum of absolute difference, but the present, invention is not limited thereto. In order to calculate the correlation value, comparison is made for each block in which many pixels configure one block.

Figure 5:
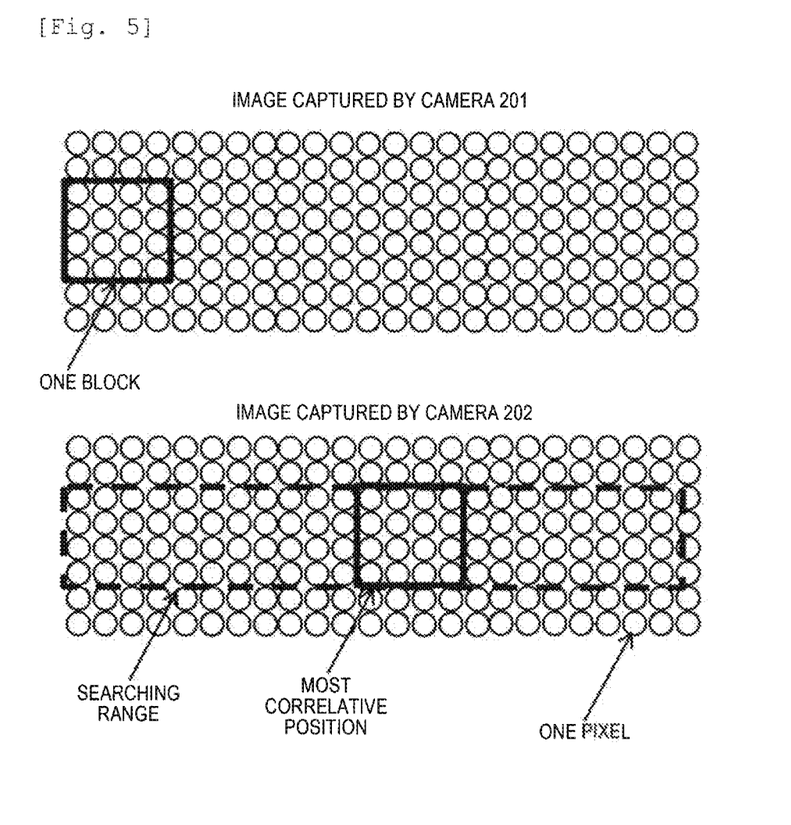
FIG. 5 is a view for describing correlation value calculation of the imaging apparatus according to the present invention.

FIG. 5 shows an image view when one block is configured to include four vertical pixels and four horizontal pixels. A region surrounded by a dotted line shows a state where one block of the camera 201 is set to be a template so as to perform a searching process from the image captured by the camera 202. This searching process is performed for every block size of the camera 201 so as to generate a parallax image. The parallax image represents a distance between the respective pixels. However, since one parallax image is obtained from every four vertical pixels and four horizontal pixels, resolution is lowered to a quarter.

As described above, the correlation value calculation unit 207 calculates the correlation value, calculates the parallax, and generates the parallax image.

The three-dimensional object detection unit 209 can detect any three-dimensional object (moving body such as a pedestrian) by calculating three-dimensional positions from a parallax image and by grouping close positions. In addition, the three-dimensional object detection unit 209 generally performs an identification process by using luminance information of an original image, that is, an image captured by the camera 201, and by means of pattern matching.

Figure 3:
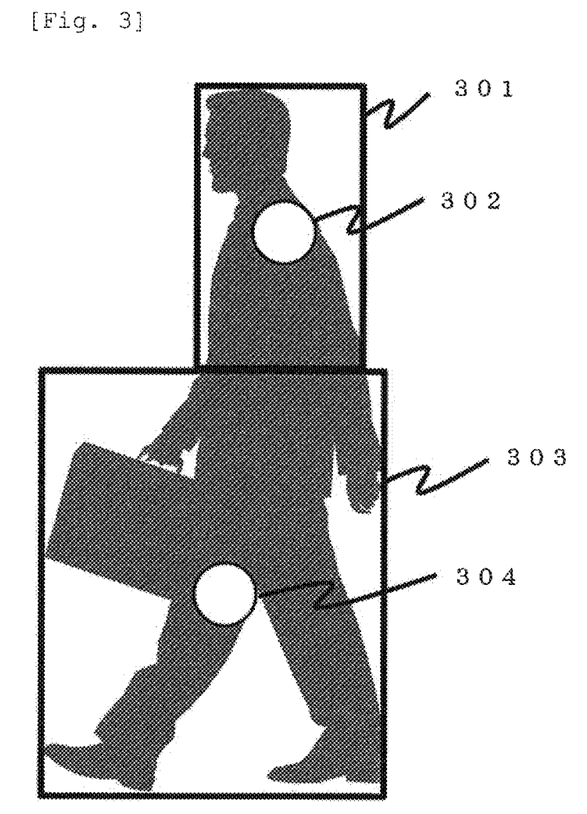
FIG. 3 is a view for describing a region dividing process of the imaging apparatus according to the present invention.

The region dividing unit 210 divides a region based on the output result from the three-dimensional object detection unit 209. The dividing method is not particularly limited. However, for example, as illustrated in FIG. 3, the region is divided into a first region (upper body 301) and a second region (lower body 303). The divided position is not limited and the region may be divided in half on the height basis. However, if the region is divided at the height position of the shoulder, arm spreading allows the imaging apparatus to be less affected by an error of the relative speed. Accordingly, it becomes easy to distinguish two regions from each other when the pedestrian walks.

The relative speed calculation unit 211 searches for association between the past images stored in the storage unit and the current images from the output result of the region dividing unit 210, and selects the images which are the same as each other. The storage unit stores the past positions and images, and calculates a movement amount for the associated images. The calculation method of the movement amount according to the present invention is not limited. However, for example, centroid positions 302 and 304 of the regions (first region and second region) for detecting the three-dimensional object may be determined so as to obtain the movement amount at the centroid positions. The relative speed (dv) is obtained by Equation 2 below, based on a time (dt) required from the previous frame to the current frame and a movement distance (dx).

(Equation 2)

$$dv = dx \div dv \qquad (2)$$

That is, the relative speed calculation unit 211 calculates the movement amount, and calculates the relative speed from the calculated movement amount.

The reliability calculation unit 212 calculates reliability from the relative speed obtained from the relative speed calculation unit 211. According to the calculation method of the reliability, the reliability is output in accordance with a matching degree of the relative speeds obtained in each divided region for one three-dimensional object. For example, the inverse of a difference between the relative speeds in each region can represent the matching degree. If the relative speed of the upper body 301 and the relative speed of the lower body 303 are the same as each other, the moving body is surely moved. Accordingly, the reliability is high. In contrast, if only the upper body 301 shows the relative speed and the lower body 303 shows the slower relative speed, there is high probability of the three-dimensional object not being actually moved as is in a case where the three-dimensional object simply shows a bending motion. This calculation method is particularly effective in calculating the reliability of the three-dimensional object whose shape change is conspicuous. However, the calculation method of the reliability is not limited thereto.

According to the above-described configuration, it is possible to output the reliability of whether or not the three-dimensional object is actually moved.

Embodiment 2

Figure 4:
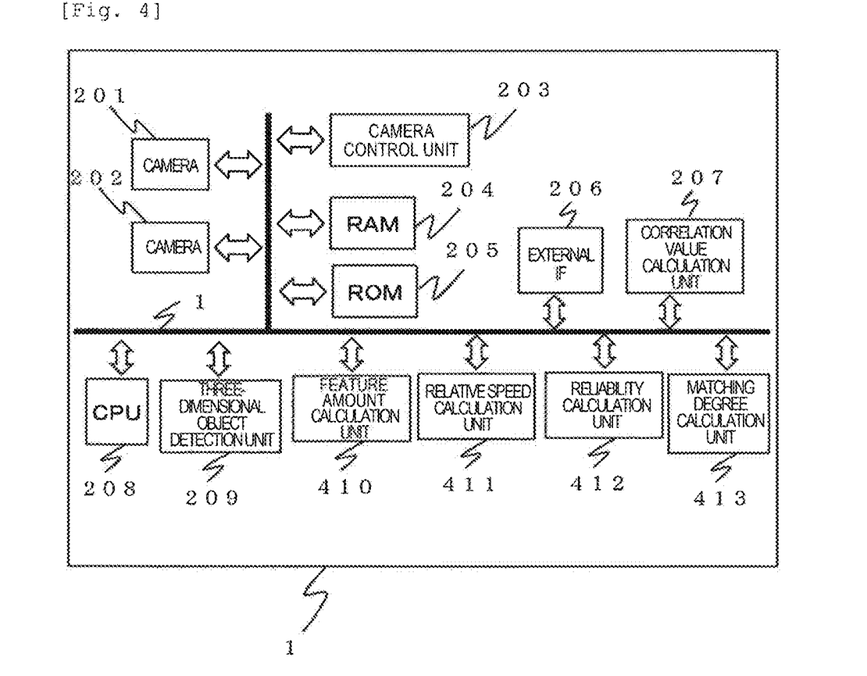
FIG. 4 is a view illustrating another example of the configuration of the imaging apparatus according to the present invention.

FIG. 4 illustrates an overall system configuration of a distance measurement method in an imaging apparatus which functions as a stereo camera according to the second embodiment of the present invention. In the present embodiment, a case will be described where the calculation method of the reliability is based on similarity between images. FIG. 4 is a configuration diagram in the case where the calculation method of the reliability is based on the similarity between the images. Description for the blocks which have been already described in Embodiment 1 will be omitted.

A feature amount calculation unit 410 calculates a feature amount for a position on an image from position information of the three-dimensional object which is output from the three-dimensional object detection unit 209. The feature amount calculation unit 410 stores the past images in order to calculate the feature amount for determining a matching degree between the past images and the current images.

Herein, an example will be described where a difference in luminance values is used as the feature amount. The images acquired from the position information of the three-dimensional object are normalized so as to facilitate comparison therebetween by means of scaling. The difference in the luminance values of the normalized images is output from the feature amount calculation unit 410.

A matching degree determination unit 413 compares the feature amount obtained in this way with the past feature amount and the current feature amount, and calculates a matching degree depending on whether or not the feature amounts match each other. In a case where the matching degree is calculated, differences in the past feature amount and the current feature amount are added to each other. In this case, when the feature amounts are similar to each other, a value of the matching degree is closer to zero, and when the feature amounts are not similar to each other, the value increases.

A relative speed calculation unit 411 obtains relative speed in accordance with the output result from the matching degree calculation unit 413. The relative speed can be obtained by using a difference from the previous position. However, the relative speed is calculated by storing many past frames and by selecting a frame which has a high matching degree. Then, it is possible to accurately calculate the relative speed since the shape is stable. The matching degree may be calculated for each region divided as described in Embodiment 1. Then, if the relative speed is calculated by using a portion of only the frame which has a high matching degree instead of the overall image, it is possible to very accurately obtain the relative speed.

A reliability calculation unit 412 outputs the reliability based on the matching degree used when the relative speed calculation unit 411 calculates the relative speed. For example, a case will be described, where the first frame and the third frame among the three past frames have a high matching degree.

Although the reliability is low when the relative speed is obtained from, the first and second frames, as for the third frame, relative speed (Va) obtained using the first and third frames and relative speed (Vb) obtained from the second and third frames can be used. When a difference in the reliability is doubled, the relative speed is calculated by Equation 3 below.

(Equation 3)

$$\text{Relative Speed} = (Va \times 2 + Vb) \div 3 \qquad (3)$$

When the relative speed having the high reliability is repeatedly calculated in this way, the high reliability is output.

According to the above-described configuration, it is possible to accurately calculate the relative speed, and thus it is also possible to output the reliability at that time.

Embodiment 3

Figure 8:
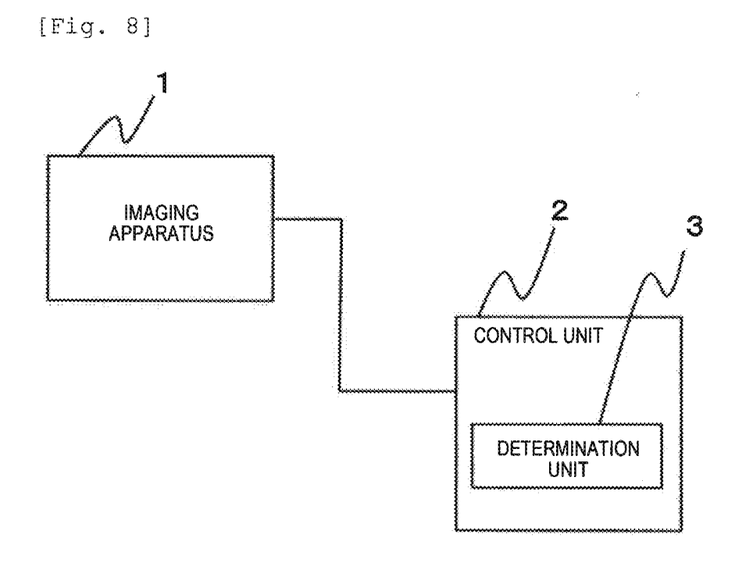
FIG. 8 is a view illustrating an example of a configuration of a vehicle controller on which the imaging apparatus according to the present invention is mounted.

In the present embodiment, an example of a vehicle controller which includes the imaging apparatus 1 described in Embodiments 1 and 2 described above, and a control unit 2 which controls a vehicle based on the output of the imaging apparatus 1 will be described with reference to FIG. 8. That is, the present embodiment is an example of controlling an automobile by using the reliability output in Embodiments 1 and 2.

Figure 6:
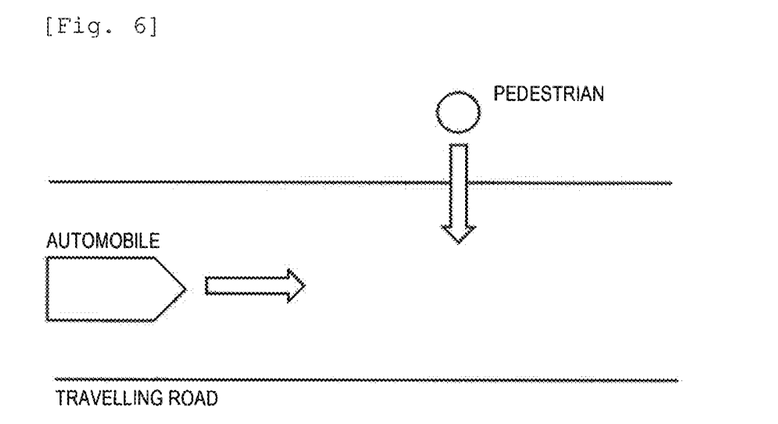
FIG. 6 is a view for describing a positional relationship in a scene where an automobile and a person collide with each other.

A scene will be described in which the automobile is likely to collide with a pedestrian illustrated in FIG. 6. However, arrows respectively indicate movement directions, and FIG. 6 illustrates a state where the pedestrian walks across (crosses) a travelling road of the automobile.

The imaging apparatus which functions as the stereo camera described in Embodiment 1 and 2 is mounted on the automobile. An example is illustrated in which the automobile is automatically braked when there is a possibility of collision.

It is possible to determine the possibility of collision based on a distance to the pedestrian, the speed of the automobile, and the movement speed of the pedestrian. However, if the reliability output from the reliability calculation units 212 and 412 of the imaging apparatuses according to Embodiments 1 and 2 is lower than a predetermined value, the vehicle controller determines that the pedestrian does not actually travel (move), and determines that there is a high possibility of erroneous measurement.

Figure 7:
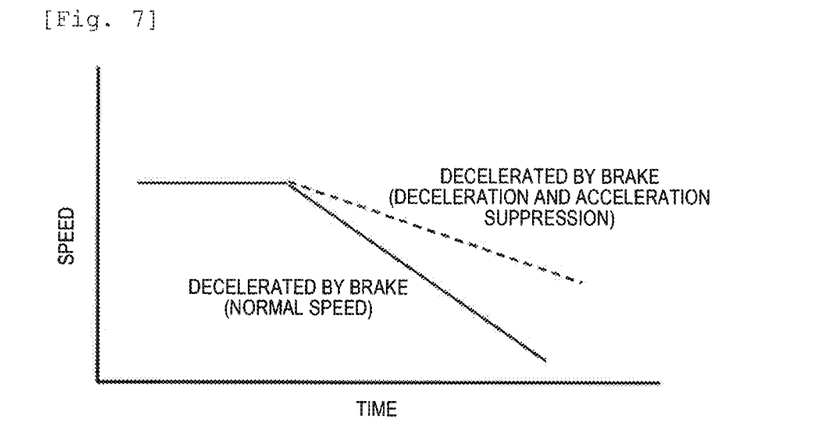
FIG. 7 is a view in which deceleration and acceleration are variable in accordance with reliability.

Therefore, a configuration is adopted which includes the control unit 2 for controlling deceleration and acceleration based on the reliability. In this manner, the control unit 2 controls deceleration and acceleration by using characteristics in which deceleration of the brake varies between a normal state and a deceleration and acceleration suppression state as illustrated in FIG. 7. Accordingly, it is possible to prevent the automobile from being erroneously and suddenly stopped.

In addition, it is very dangerous to a driver if the automobile is unintentionally and automatically braked. Accordingly, it is also possible to adopt a configuration in which only a warning sound installed in the automobile is given without decelerating the speed when the reliability is lower than the predetermined value. That is, the control unit 2 is configured to include a determination unit 3 which determines whether to control deceleration and acceleration, or whether to output a warning signal, based on the reliability calculated by the imaging apparatus 1. According to this configuration, if the driver hears the warning sound and really feels dangerous, the driver can step on the brake. Even if the imaging apparatus erroneously detects the pedestrian who does not cross the road, the automobile is not automatically braked. Therefore, it is possible to avoid the worst case.

REFERENCE SIGNS LIST

201 CAMERA
202 CAMERA
203 CAMERA CONTROL UNIT
207 CORRELATION VALUE CALCULATION UNIT
209 THREE-DIMENSIONAL OBJECT DETECTION UNIT
210 REGION DIVIDING UNIT
211 RELATIVE SPEED CALCULATION UNIT
212 RELIABILITY CALCULATION UNIT

The invention claimed is:

1. An imaging apparatus which has two imaging units, comprising:
   a correlation value processor programmed to calculate a correlation value from two images captured by the two imaging units;
   a three-dimensional object determination processor programmed to determine an existence of a three-dimensional object from the two images;
   a region dividing processor programmed to divide an image region including the three-dimensional object into multiple regions;
   a relative speed processor programmed to calculate relative speed for every region of the multiple regions;
   a reliability calculation processor programmed to calculate a reliability of a determination of the existence of the three-dimensional object, based on the relative speed calculated for every region;
   a feature amount processor programmed to calculate a feature amount from an image including the three-dimensional object detected by the three-dimensional object determination processor; and
   a matching degree processor programmed to calculate a matching degree of the feature amount between a past feature amount which is stored and a current feature amount which is calculated,
   wherein the relative speed processor calculates the relative speed, based on the calculated matching degree.

2. The imaging apparatus according to claim 1,
   wherein the region dividing processor vertically divides the image region including the three-dimensional object into two regions.

3. The imaging apparatus according to claim 2,
   wherein the region dividing processor divides the image region into two regions based on a shoulder position of a pedestrian, when the three-dimensional object is the pedestrian.

4. The imaging apparatus according to claim 1,
   wherein the correlation value processor generates a parallax image based on a calculation result of the correlation value, and the three-dimensional object determination processor determines the existence of the three-dimensional object by using the parallax image.

5. The imaging apparatus according to claim 1,
   wherein the reliability calculation processor calculates a reliability of whether or not the three-dimensional object moves, based on a matching degree of the relative speed calculated for every region.

6. The imaging apparatus according to claim 1,
   wherein the reliability calculation processor calculates the reliability of the determination of the existence of the three-dimensional object, based on the matching degree of the feature amount.

7. The imaging apparatus according to claim 1,
   wherein the relative speed processor calculates the relative speed by selecting a frame in which the matching degree of the feature amount is highest from the past frames which are stored.

8. A vehicle controller comprising:
   an imaging apparatus having a correlation value processor programmed to calculate a correlation value from two images captured by two imaging units, a three-dimensional object determination processor programmed to determine an existence of a three-dimensional object from the two images, a region dividing processor programmed to divide an image region including the three-dimensional object into multiple regions, a relative speed processor programed to calculate a relative speed for every region of the multiple regions, and a reliability processor programmed to calculate a reliability of a determination of the existence of the three-dimensional object, based on the relative speed calculated for every region, a feature amount processor programmed to calculate a feature amount from an image including the three-dimensional object detected by the three-dimensional object determination processor; and a matching degree processor programmed to calculate a matching degree of the feature amount between a past feature amount which is stored and a current feature amount which is calculated, wherein the relative speed processor calculates the relative speed, based on the calculated matching degree; and
   a control unit that controls deceleration and acceleration, based on the reliability calculated by the imaging apparatus.

9. The vehicle controller according to claim 8,
wherein the control unit determines whether to control the deceleration and the acceleration, or whether to output a warning signal, based on the reliability calculated by the imaging apparatus.

* * * * *